United States Patent
Kazakevich et al.

(10) Patent No.: US 10,476,655 B2
(45) Date of Patent: Nov. 12, 2019

(54) METHODS, APPARATUSES, SYSTEMS, DEVICES, AND COMPUTER PROGRAM PRODUCTS DIRECTED TO LOW LATENCY BANDWIDTH EFFICIENT COMMUNICATIONS WITH LOW DUPLEX SPACING

(71) Applicant: InterDigital Patent Holdings, Inc., Wilmington, DE (US)

(72) Inventors: Leonid L Kazakevich, Plainview, NY (US); Erdem Bala, East Meadow, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 112 days.

(21) Appl. No.: 15/559,951

(22) PCT Filed: Mar. 22, 2016

(86) PCT No.: PCT/US2016/023616
§ 371 (c)(1),
(2) Date: Sep. 20, 2017

(87) PCT Pub. No.: WO2016/154219
PCT Pub. Date: Sep. 29, 2016

(65) Prior Publication Data
US 2018/0076947 A1  Mar. 15, 2018

Related U.S. Application Data

(60) Provisional application No. 62/136,680, filed on Mar. 23, 2015.

(51) Int. Cl.
| | |
|---|---|
| *H04L 5/14* | (2006.01) |
| *H04W 72/08* | (2009.01) |
| *H04L 5/00* | (2006.01) |

(52) U.S. Cl.
CPC .......... *H04L 5/1461* (2013.01); *H04L 5/0037* (2013.01); *H04L 5/1469* (2013.01); *H04W 72/082* (2013.01)

(58) Field of Classification Search
CPC ....... H04L 5/0037; H04L 5/14; H04L 5/1461; H04L 5/1469; H04W 72/082
See application file for complete search history.

(56) References Cited

U.S. PATENT DOCUMENTS

| | | |
|---|---|---|
| 2012/0063373 A1 | 3/2012 | Chincholi et al. |
| 2012/0243447 A1 | 9/2012 | Weissman et al. |
| (Continued) | | |

FOREIGN PATENT DOCUMENTS

| | | | |
|---|---|---|---|
| EP | 2913953 A1 * | 9/2015 | ........... H04L 5/0041 |
| WO | WO-2014/036025 | 3/2014 | |

OTHER PUBLICATIONS

"International Search Report and Written Opinion", International Patent Application No. PCT/US16/023616, dated Jun. 30, 2016, 14 pages.

(Continued)

*Primary Examiner* — Paul H Masur
(74) *Attorney, Agent, or Firm* — Julian F. Santos

(57) ABSTRACT

Methods, apparatuses, systems, devices, and computer program products directed to low latency, bandwidth efficient communications with low duplex spacing (LDS) are provided. The LDS communications are facilitated by partitioning a (e.g., single) channel to include DL and UL portions (or "bandwidth fragments") with low duplex spacing between the DL and UL portions. Among the new methodologies provided herein is a method that may include partitioning a channel to include a first bandwidth fragment that is bounded by, and overlaps or has low duplex spacing with, a pair of non-overlapping bandwidth fragments that are symmetrically offset symmetrically from a reference frequency associated with the channel; receiving a receive signal while transmitting a transmit signal on either the first bandwidth fragment or the pair non-overlapping bandwidth fragments; and using any of cancellation and interference reduction to reduce a portion of the receive signal that corresponds to the transmit signal.

20 Claims, 9 Drawing Sheets

(56) References Cited

U.S. PATENT DOCUMENTS

| | | |
|---|---|---|
| 2012/0320818 A1 | 12/2012 | Yang et al. |
| 2014/0016515 A1 | 1/2014 | Rittwik et al. |
| 2015/0098425 A1* | 4/2015 | Bergljung ............... H04L 5/001 370/329 |
| 2015/0229461 A1* | 8/2015 | DiFazio .................... H04L 5/14 370/280 |
| 2016/0173165 A1* | 6/2016 | Choi ....................... H04B 1/525 455/78 |
| 2016/0323830 A1* | 11/2016 | Kim .................... H04W 72/082 |

OTHER PUBLICATIONS

Bharadia, Dinesh, et al., "Full Duplex Radios", ACM SIGCOMM' 13, Hong Kong, China, Aug. 12-16, 2013, 12 pages.

Duarte, Melissa, et al., "Design and Characterization of a Full-Duplex Multiantenna System for WiFi Networks", IEEE Transactions on Vehicular Technology, vol. 63, No. 3, Mar. 2014, pp. 1160-1177.

Goyal, S, et al., "Full Duplex Operation for Small Cells", http://arxiv.org/abs/1412.8708, Sep. 30, 2015, 34 pages.

Hong, Steven, et al., "Picasso: Flexible RF and Spectrum Virtualization", ACM SIGCOMM 2012, Helsinki, Finland, Aug. 13-17, 2012, 12 pages.

Jain, Mayank, et al., "Practical, Real-time, Full Duplex Wireless", MobiCom '11, Las Vegas, Nevada, Sep. 19-23, 2011, 12 pages.

Sabharwal, Ashutosh, et al., "In-Band Full-Duplex Wireless: Challenges and Opportunities", IEEE Journal on Selected Areas in Communications, vol. 32, No. 9, Sep. 2014, pp. 1637-1652.

\* cited by examiner

METHODS, APPARATUSES, SYSTEMS, DEVICES, AND COMPUTER PROGRAM PRODUCTS DIRECTED TO LOW LATENCY BANDWIDTH EFFICIENT COMMUNICATIONS WITH LOW DUPLEX SPACING

CROSS REFERENCE TO RELATED APPLICATIONS

This application is a National Stage of International Application No. PCT/US16/23616, filed 22 Mar. 2016, which claims the benefit of U.S. Provisional Patent Application No. 62/136,680, filed 23 Mar. 2015, which is incorporated herein by reference.

BACKGROUND

Field

The present disclosure relates generally to communications with low duplex spacing.

Related Art

Among the various ways to increase spectral efficiency, in-band full-duplex (FD) communication has recently gained attention. FD communication enables a wireless communications device (e.g., WTRU, e-Node B, etc.) to transmit and receive simultaneously over the same frequency channel. Due to its potential in increasing spectral efficiency, FD communication may be of great interest for next-generation wireless networks. However, FD communication has, until now, not seen widespread use due to problems such as self-interference, uncontrolled interference from non-coordinated devices (e.g., users), and scattering-caused interference.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref.") in the Figures indicate like elements, and wherein.

DETAILED DESCRIPTION

Figure 1A:
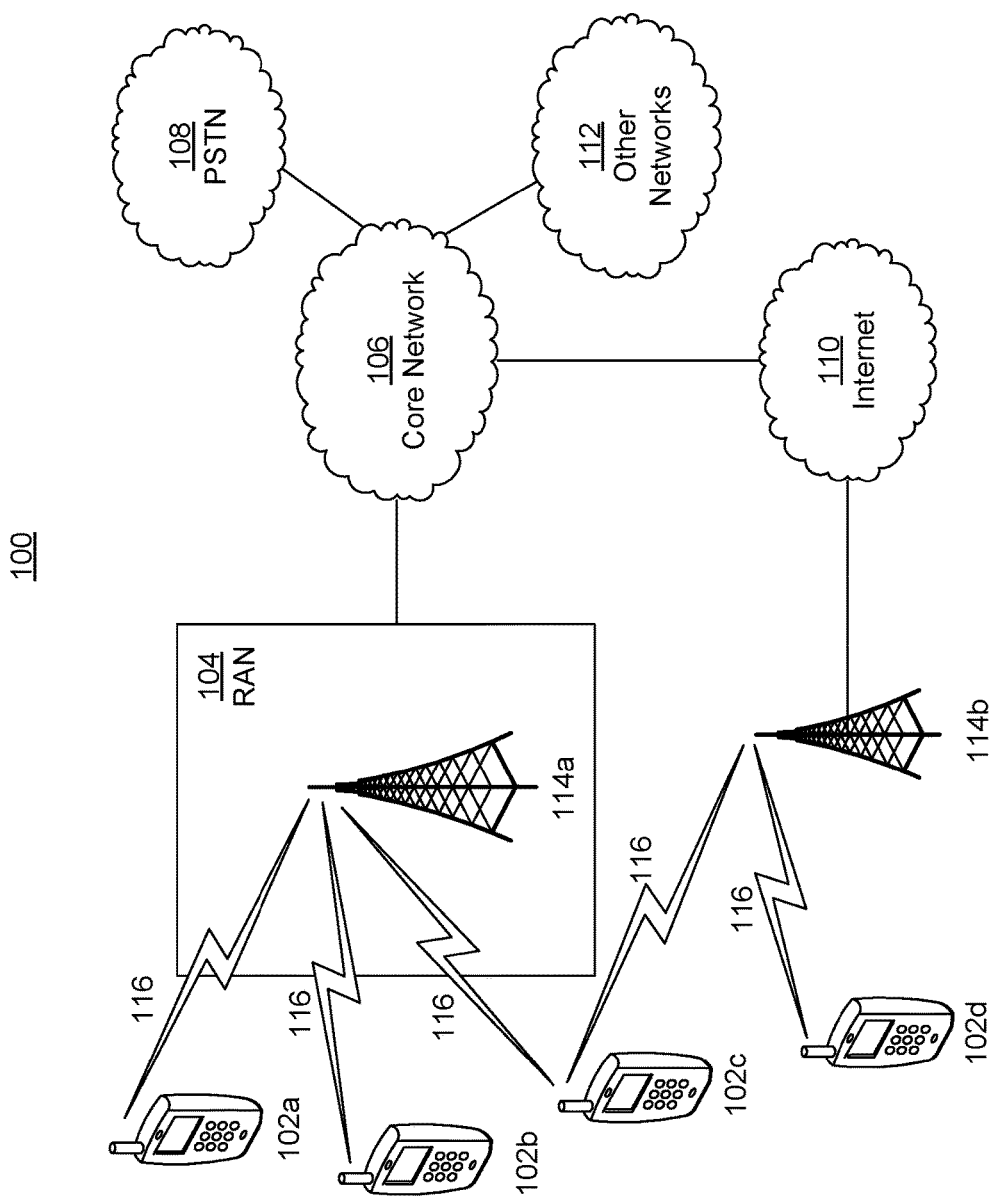
FIG. 1A is a system diagram of an example communications system in which one or more disclosed embodiments may be implemented.

FIG. 1A is a diagram of an example communications system 100 in which one or more disclosed embodiments may be implemented. Example communications system 100 is provided for the purpose of illustration only and is not limiting of the disclosed embodiments. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
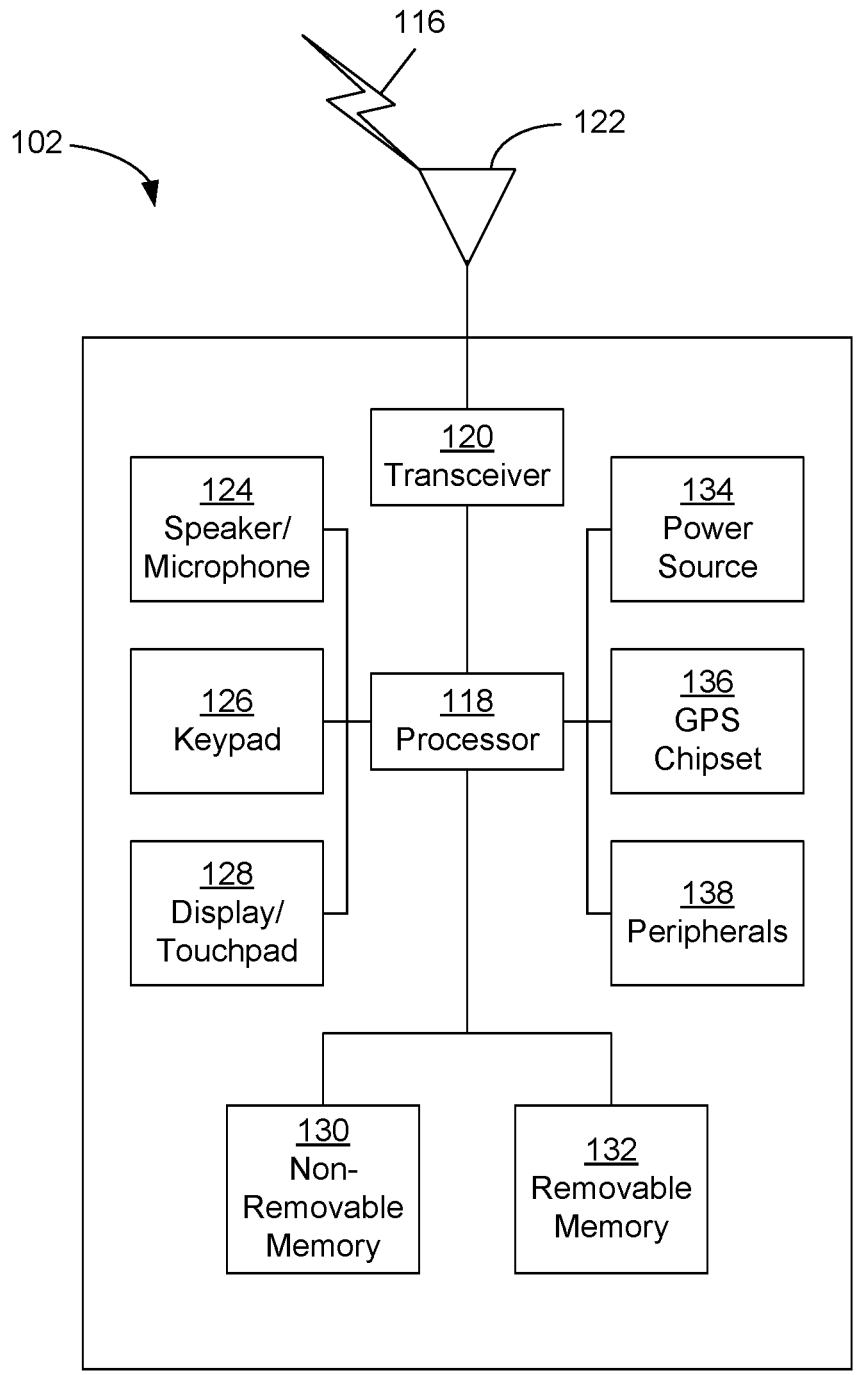
FIG. 1B is a system diagram of an example wireless transmit/receive unit (WTRU) that may be used within the communications system illustrated in FIG. 1A.

FIG. 1B is a system diagram of an example WTRU 102. Example WTRU 102 is provided for the purpose of illustration only and is not limiting of the disclosed embodiments. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
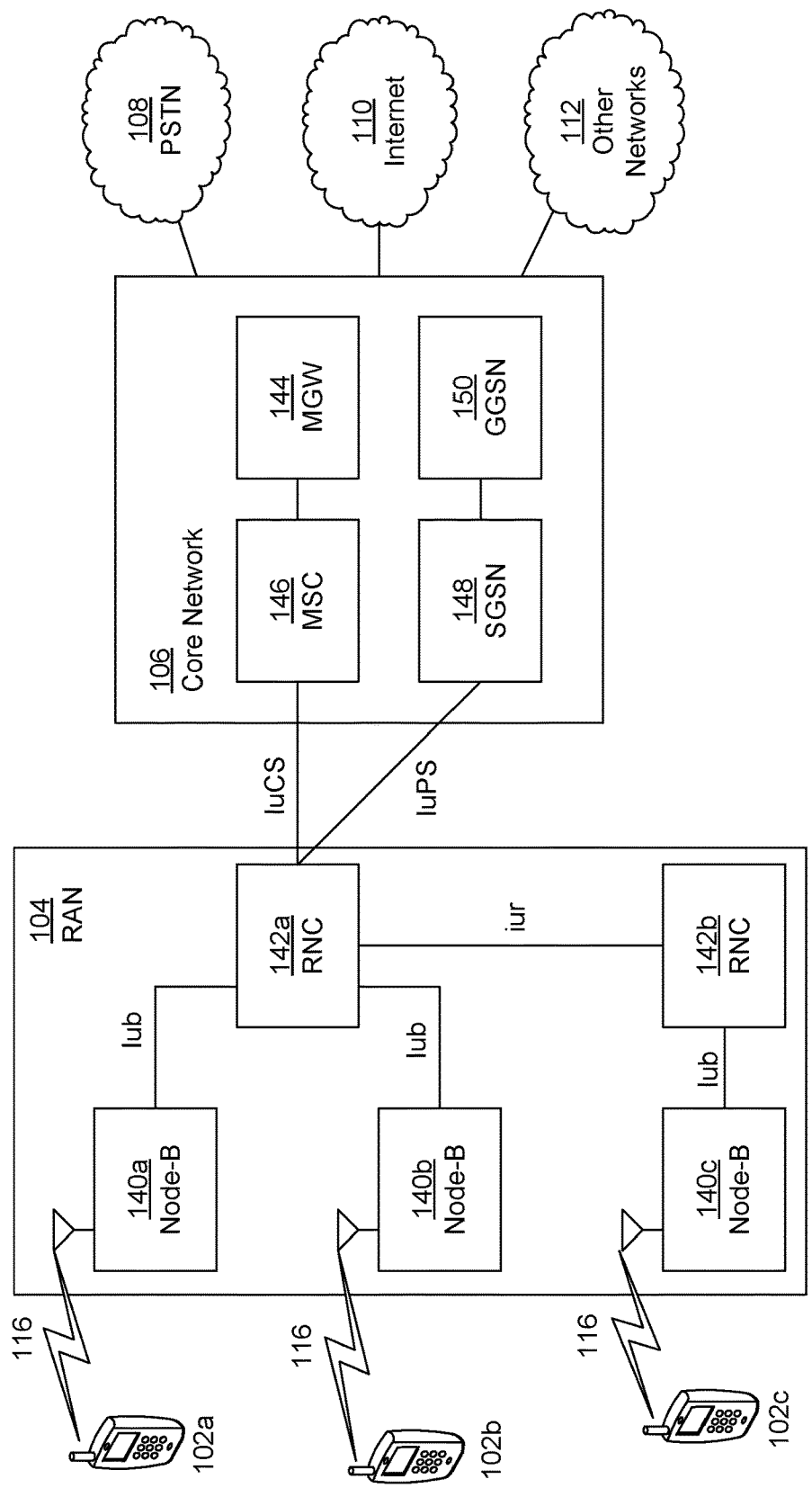
FIGS. 1C, 1D, and 1E are system diagrams of example radio access networks and example core networks that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, and 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
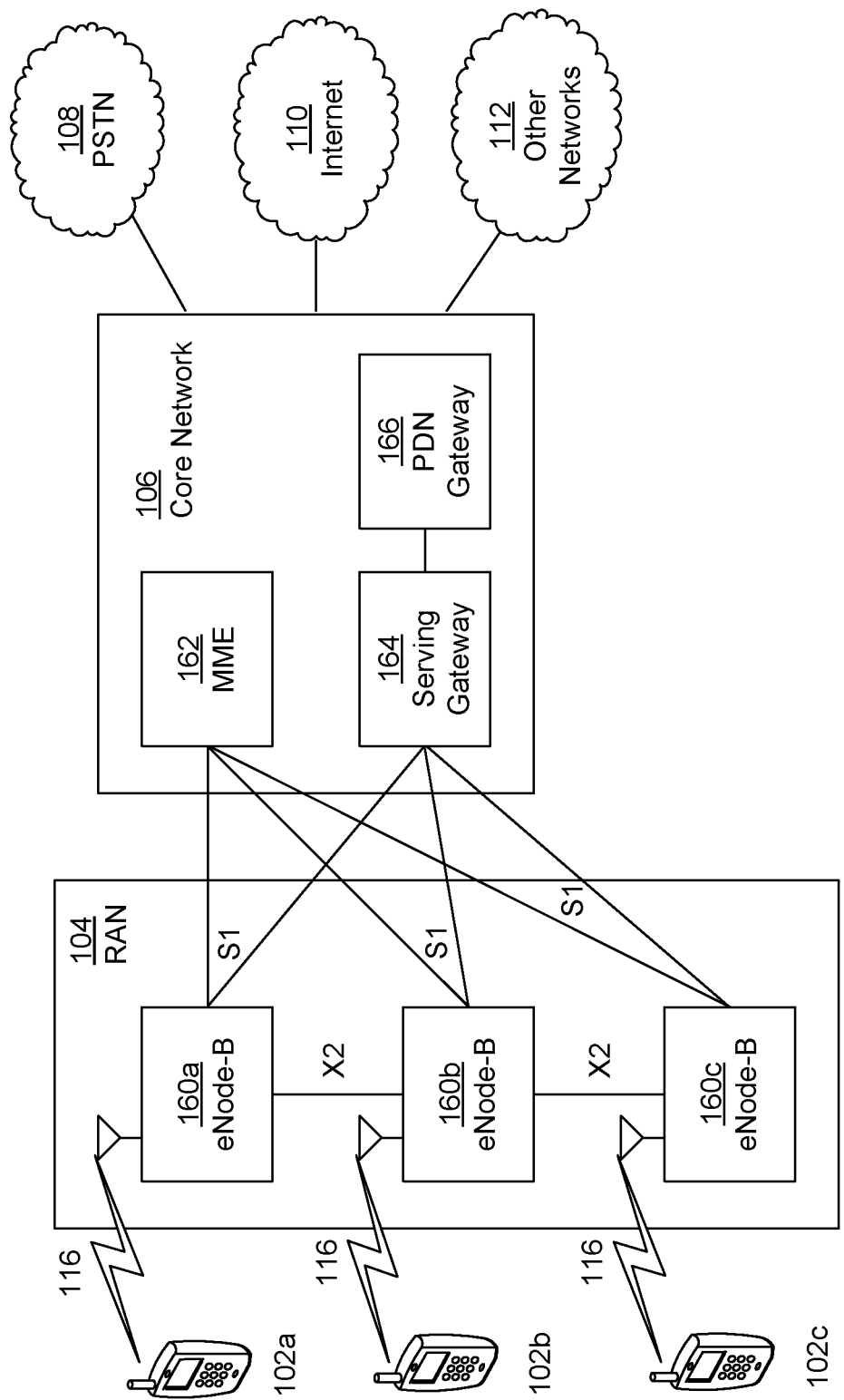

FIG. 1D is a system diagram of the RAN 104 and the core network 106 according to another embodiment. As noted above, the RAN 104 may employ an E-UTRA radio technology to communicate with the WTRUs 102a, 102b, and 102c over the air interface 116. The RAN 104 may also be in communication with the core network 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 106 shown in FIG. 1D may include a mobility management gateway (MME) 162, a serving gateway 164, and a packet data network (PDN) gateway 166. While each of the foregoing elements are depicted as part of the core network 106, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
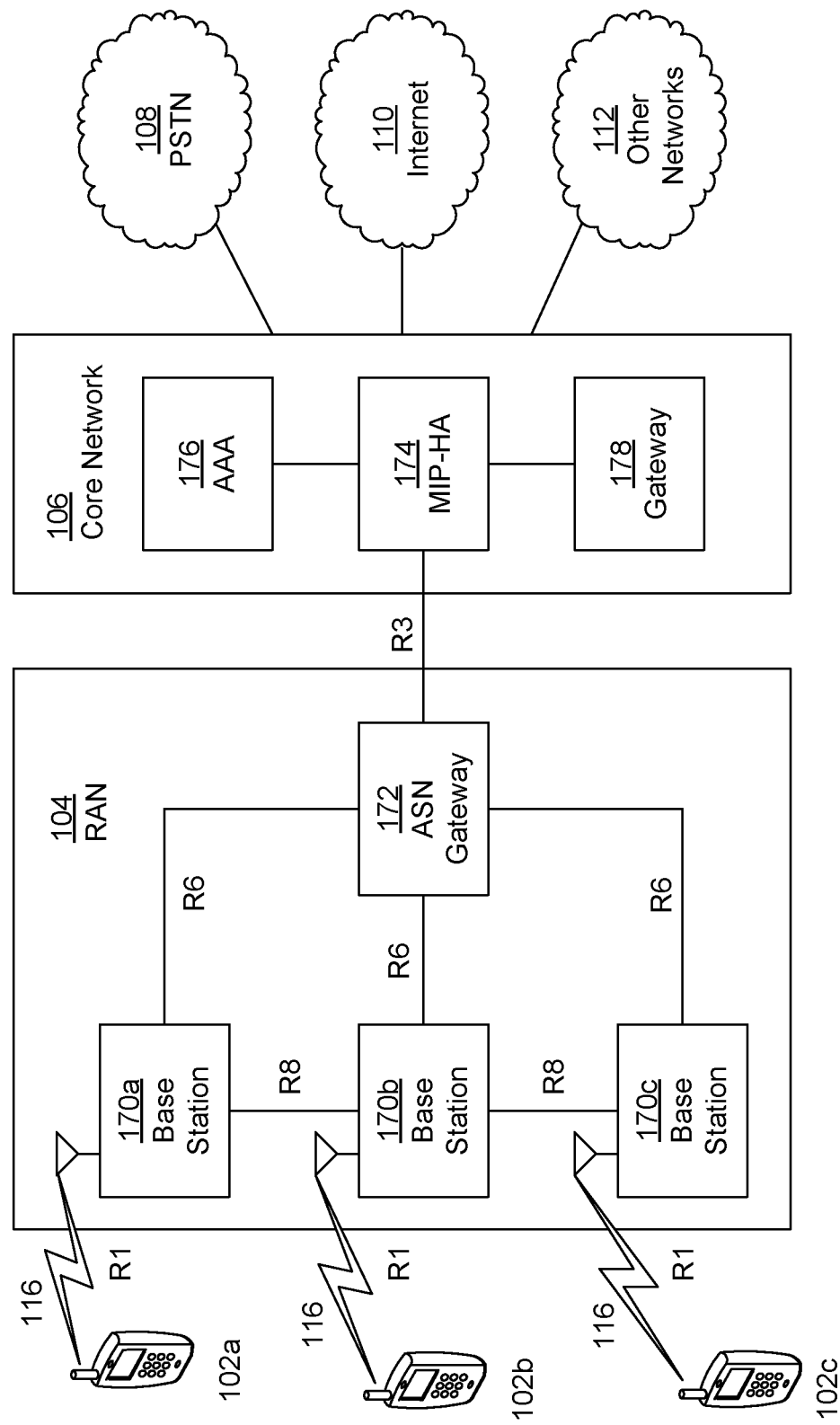

FIG. 1E is a system diagram of the RAN 104 and the core network 106 according to another embodiment. The RAN 104 may be an access service network (ASN) that employs IEEE 802.16 radio technology to communicate with the WTRUs 102a, 102b, and 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 170a, 170b, 170c, and an ASN gateway 172, though it will be appreciated that the RAN 104 may include any number of base stations and ASN gateways while remaining consistent with an embodiment. The base stations 170a, 170b, 170c may each be associated with a particular cell (not shown) in the RAN 104 and may each include one or more transceivers for communicating with the WTRUs 102a, 102b, 102c over the air interface 116. In one embodiment, the base stations 170a, 170b, 170c may implement MIMO technology. Thus, the base station 170a, for example, may use multiple antennas to transmit wireless signals to, and receive wireless signals from, the WTRU 102a. The base stations 170a, 170b, 170c may also provide mobility management functions, such as handoff triggering, tunnel establishment, radio resource management, traffic classification, quality of service (QoS) policy enforcement, and the like. The ASN gateway 172 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, and 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 170a, 170b, and 170c may be defined as an R8 reference point that includes protocols for facilitating WTRU handovers and the transfer of data between base stations. The communication link between the base stations 170a, 170b, 170c and the ASN gateway 172 may be defined as an R6 reference point. The R6 reference point may include protocols for facilitating mobility management based on mobility events associated with each of the WTRUs 102a, 102b, 102c.

As shown in FIG. 1E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 174, an authentication, authorization, accounting (AAA) server 176, and a gateway 178. While each of the foregoing elements are depicted as part of the core network 106, it will be appreciated that any one of these elements may be owned and/or operated by an entity other than the core network operator.

The MIP-HA 174 may be responsible for IP address management, and may enable the WTRUs 102a, 102b, and 102c to roam between different ASNs and/or different core networks. The MIP-HA 174 may provide the WTRUs 102a, 102b, 102c with access to packet-switched networks, such as the Internet 110, to facilitate communications between the WTRUs 102a, 102b, 102c and IP-enabled devices. The AAA server 176 may be responsible for user authentication and for supporting user services. The gateway 178 may facilitate interworking with other networks. For example, the gateway 178 may provide the WTRUs 102a, 102b, 102c with access to circuit-switched networks, such as the PSTN 108, to facilitate communications between the WTRUs 102a, 102b, 102c and traditional land-line communications devices. In addition, the gateway 178 may provide the WTRUs 102a, 102b, 102c with access to the networks 112, which may include other wired or wireless networks that are owned and/or operated by other service providers.

Although not shown in FIG. 1E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Overview

As noted above, problems such as self-interference, uncontrolled interference from non-coordinated devices (e.g., users), and scattering-caused interference have hindered widespread use of FD communication Self-interference refers to the interference (e.g., crosstalk) caused by a device's own transmission to a desired signal being received by the device over the same channel Generally, self-interference cannot be wholly cancelled in the digital domain because of limited dynamic range of analog-to-digital converters (ADCs) used in one or more receive chains of the device. Digital-domain cancellation can suppress self-interference only up to an effective dynamic range of the ADCs. Analog cancellation and/or cancellation by antenna design may also be used to reduce or suppress self-interference. Details of an example of the analog cancellation and/or cancellation by antenna design may be found in Sabharwal et al. "In-Band Full-Duplex Wireless: Challenges and Opportunities," Selected Areas in Communications, IEEE Journal on, vol. 32, no. 9, pp. 1637,1652, September 2014, which is incorporated herein by reference.

Uncontrolled interference from non-coordinated devices refers to the interference suffered by a device from non-coordinated transmissions of other devices using the same channel. This may include the non-coordinated transmissions interfering with the reception of a desired signal by the device and/or jamming a transmitted signal by the device, causing its unsuccessful reception by its intended destination.

Scattering-caused interference refers to the interference caused by the scattering of a transmitted signal. This may include numerous reflections of the transmitted signal (e.g., reflections from close objects) received at various delays from transmission time and with widely varying amplitudes. Because of the highly varying nature of the reflections, a highly dynamic suppression scheme may be needed to effectively suppress scattering-caused interference in FD communication systems.

Several FD communication radio designs have been proposed in the literature. For example, Jain et al. ("Practical, real-time, full duplex wireless," MobiCom '11, pages 301-12, New York, N.Y., USA, 2011. ACM) proposes using a (balanced-to-unbalanced transformer ("balun") to generate an inverted version of a device's transmitted analog signal. The inverted signal is then adjusted (delay and/or attenuation) to match and cancel the self-interference being experienced by the device. But cancellation according to this design is limited (about 25 dB) due to the technique's sensitivity to accurate matching of the self-interference delay. For example, precise programmable delays with resolution as low as a few picoseconds may be needed to adequately match the delay experienced by the transmitted signal from the transmit antenna to the receive antenna of the device to generate the self-interference. In practice, such programmable delays are extremely difficult to produce.

Bharadia et al. ("Full Duplex Radios," ACM SIGCOMM 2013) proposes tapping the transmit chain of the device to generate a small copy (low power replica) of the transmitted signal before it is input into a circulator. The transmitted signal replica is then fed into a circuit composed of parallel lines of different fixed delays (e.g., wires of different lengths) and tunable attenuators. The resulting signal is then used to suppress self-interference. But a key challenge in this design includes properly selecting the fixed delays as well as dynamically programming the tunable attenuators to maximize self-interference cancellation.

Another design proposed by Duarte et al. ("Design and Characterization of a Full-Duplex Multiantenna System for WiFi Networks," *Vehicular Technology, IEEE Transactions on*, vol. 63, no. 3, pp. 1160, 1177, March 2014) uses an extra transmit chain (in addition to a main transmit chain) to generate a cancellation signal. The cancellation signal is combined with the received signal in the receive chain to cancel self-interference. Duarte et al. however assumes that the transmit and receive antennas of the device are separated by about 20 cm.

Hong et al. ("Picasso: Flexible RF and Spectrum Virtualization," ACM SIGCOMM 2012) proposes dividing a transmission band into downlink (DL) and uplink (UL) fragments by using the analog cancellation approach proposed by Bharadia et al. Each fragment is treated as a separate channel that is used in a time division duplexing (TDD) fashion. But the technique requires high (large) duplex spacing between the fragments along with a high resolution ADC, and does not provide low latency and reduced complexity benefits.

In practice, FD communications can suffer from several disadvantages, including increased radio design complexity, size, and cost (making implementation in mobile devices challenging), difficulty achieving broadband operation with a high level of interference suppression, inadequate suppression of scattering-caused interference, and difficulty managing uncontrolled interference between non-coordinated devices. In addition, the theoretical benefits of FD communications are difficult to achieve in practice. For example, the envisioned capacity of an FD system as being double that of a half-duplex (HD) system can only be attained with equal DL and UL traffic loads. In practice, a typical DL/UL traffic ratio is about 10:1. Performance gains such as energy efficiency may also be degraded significantly by network level interference in FD operation, e.g., as described in Goyal et al. ("Full Duplex Operation for Small Cells", eprint arXiv:1412.8708, Sep. 30, 2015, 34pages).

Introduction

Methods, apparatuses, systems, devices, and computer program products directed to low latency, bandwidth efficient communications with low duplex spacing (hereinafter "low duplex spacing (LDS) communications") are provided. The LDS communications are facilitated by partitioning a bandwidth of a (e.g., single) channel to include DL and UL portions (or "bandwidth fragments") with low duplex spacing between the DL and the UL portions. Because the channel may be used for DL and UL transmissions simultaneously, the LDS communications realize similar low latency benefits as FD communications. And with no or low overlap between the DL and UL portions, adequate isolation between DL and UL signals can be achieved with much lower complexity and cost compared to FD communications. The LDS communications may be suited for any communication system where FD communications may be desired or used, including, for example, IEEE 802.11, future generation WiFi, LTE, and future (e.g., fifth generation (5G)) wireless communication systems. LDS communications and/or systems in accordance with the teachings herein may be particularly suited for military, small (e.g., femto, pico, etc.) cell or other applications in which only a single channel (or at best a few channels) are available for use. When only a single channel or a few channels are available, FD is impracticable and/or impossible, and HD is inefficient as compared to such LDS communications and/or systems.

Among new methodologies and/or technologies provided herein is a method that may include partitioning a bandwidth of a channel ("channel bandwidth") to include a first bandwidth fragment that is bounded by, and overlaps or has low duplex spacing with, a pair of non-overlapping bandwidth fragments that are symmetrically offset symmetrically from a reference frequency. The first bandwidth fragment may be used for UL and the pair of non-overlapping bandwidth fragments may be used for DL. Alternately, the first bandwidth fragment may be used for DL and the pair of non-overlapping bandwidth fragments may be used for UL. The method may also include receiving, via one or more receive antennas, a receive signal while transmitting, via one or more transmit antennas, a transmit signal on either the first bandwidth fragment or the pair non-overlapping bandwidth fragments. The method may further include using any of cancellation and interference reduction to reduce a portion of the receive signal that corresponds to the transmit signal.

Among new methodologies and/or technologies provided herein is a wireless communication device that may include a processor, a transmitter, a receiver, one or more receive antennas, one or more transmit antennas and signal compensation circuitry. The processor may be configured to partition a bandwidth of a channel to include a first bandwidth fragment that is bounded by, and overlaps or has low duplex spacing with, a pair of non-overlapping bandwidth fragments that are symmetrically offset from a reference frequency associated with the channel. The first bandwidth fragment may be used for UL and the pair of non-overlapping bandwidth fragments may be used for DL. Alternately, the first bandwidth fragment may be used for DL and the pair of non-overlapping bandwidth fragments may be used for UL. The receiver may be configured to receive, via the receive antennas, a receive signal while the transmitter transmits, via the transmit antennas, a transmit signal on either the first bandwidth fragment or the pair non-overlapping bandwidth fragments. The signal compensation circuitry may be configured to carry out any of cancellation and interference reduction to reduce a portion of the receive signal that corresponds to the transmit signal.

Among new methodologies and/or technologies provided herein is a method for communicating over a channel, which method may include transmitting, via one or more antennas, a transmit signal using a pair of non-overlapping bandwidth fragments of the channel. The pair of non-overlapping fragments may be symmetrically offset from a reference frequency associated with the channel. The first bandwidth fragment may be used for UL and the pair of non-overlapping bandwidth fragments may be used for DL. Alternately, the first bandwidth fragment may be used for DL and the pair of non-overlapping bandwidth fragments may be used for UL. The method may also include receiving, via the antennas, a receive signal from the channel while the transmit signal is being transmitted. The receive signal may include a desired signal transmitted using a first bandwidth fragment of the channel. The first bandwidth fragment may be bounded by, and overlap or have low duplex spacing with, the pair of non-overlapping bandwidth fragments. The first bandwidth fragment may be used for UL and the pair of non-overlapping bandwidth fragments may be used for DL. Alternately, the first bandwidth fragment may be used for DL and the pair of non-overlapping bandwidth fragments may be used for UL. The method may further include generating a cancellation signal based on the transmit signal and a channel response; and using the cancellation signal to reduce one or more portions of the receive signal that correspond to the transmit signal.

Among new methodologies and/or technologies provided herein is a method for communicating over a channel, which method may include transmitting, via one or more transmit antennas, a transmit signal using a first bandwidth fragment of the channel that is bounded by, and overlaps or has low duplex spacing with, a pair of non-overlapping bandwidth fragments of the channel. The pair of non-overlapping bandwidth fragments may be symmetrically offset from a reference frequency associated with the channel. The first bandwidth fragment may be used for UL and the pair of non-overlapping bandwidth fragments may be used for DL. Alternately, the first bandwidth fragment may be used for DL and the pair of non-overlapping bandwidth fragments may be used for UL. The method may also include receiving, via one or more receive antennas, a receive signal from the channel while the transmit signal is being transmitted. The receive signal may include a desired signal transmitted using the pair of non-overlapping bandwidth fragments. The method may further include generating a cancellation signal based on the transmit signal and a channel response; and using the cancellation signal to reduce one or more portions of the receive signal that correspond to the transmit signal.

Among new methodologies and/or technologies provided herein is a wireless communication device that may include a transmitter, a receiver, one or more receive antennas, one or more transmit antennas and signal compensation circuitry. The transmitter may be configured to transmit, via the antennas, a transmit signal using a pair of non-overlapping bandwidth fragments of the channel. The pair of non-overlapping fragments may be symmetrically offset from a reference frequency associated with the channel. The receiver may be configured to receive, via the antennas, a receive signal from the channel while the transmit signal is being transmitted. The receive signal may include a desired signal transmitted using a first bandwidth fragment of the channel. The first bandwidth fragment may be bounded by, and overlap or has low duplex spacing with, the pair of non-overlapping bandwidth fragments. The first bandwidth fragment may be used for UL and the pair of non-overlapping bandwidth fragments may be used for DL. Alternately, the first bandwidth fragment may be used for DL and the pair of non-overlapping bandwidth fragments may be used for UL. The signal compensation circuitry may be configured to generate a cancellation signal based on the transmit signal and a channel response; and use the cancellation signal to reduce one or more portions of the receive signal that correspond to the transmit signal.

Among new methodologies and/or technologies provided herein is a wireless communication device that may include a transmitter, a receiver, one or more receive antennas, one or more transmit antennas and signal compensation circuitry. The transmitter may be configured to transmit, via transmit antennas, a transmit signal using a first bandwidth fragment of the channel that is bounded by, and overlaps or has low duplex spacing with, a pair of non-overlapping bandwidth fragments of the channel. The pair of non-overlapping bandwidth fragments may be symmetrically offset from a reference frequency associated with the channel. The receiver may be configured to receive, via one or more receive antennas, a receive signal from the channel while the transmit signal is being transmitted. The receive signal may include a desired signal transmitted using the pair of non-overlapping bandwidth fragments. The first bandwidth fragment may be used for UL and the pair of non-overlapping bandwidth fragments may be used for DL. Alternately, the first bandwidth fragment may be used for DL and the pair of non-overlapping bandwidth fragments may be used for UL. The signal compensation circuitry may be configured to generate a cancellation signal based on the transmit signal and a channel response; and use the cancellation signal to reduce one or more portions of the receive signal that correspond to the transmit signal.

In an embodiment, the reference frequency may be, for example, a center frequency of the channel. Alternatively, the reference frequency may be a local oscillator frequency ($F_{LO}$) corresponding to the center frequency.

In an embodiment, the low duplex spacing may be as small as single tone. Alternatively, the low duplex spacing may be as small as one percent of the channel bandwidth.

In an embodiment, the first bandwidth fragment may include a pair of bandwidth fragments that are symmetrically offset from the reference frequency. This pair of bandwidth fragments may overlap one another.

In an embodiment, the receive signal may include an uplink signal, and the transmit signal is a downlink signal. In an embodiment, the pair of non-overlapping bandwidth fragments may be allocated for uplink communications and the first bandwidth fragment may be allocated for downlink communications.

In an embodiment, each of the pair of non-overlapping bandwidth fragments have equal bandwidths. Alternatively, each of the pair of non-overlapping bandwidth fragments have non-equal bandwidths.

In an embodiment, the pair of non-overlapping bandwidth fragments and the first bandwidth fragment have equal bandwidths. Alternatively, the pair of non-overlapping bandwidth fragments and the first bandwidth fragment have non-equal bandwidths. In an embodiment, partitioning the bandwidth may include dynamically adjusting a bandwidth of one or more of the first bandwidth fragment and the pair of non-overlapping bandwidth fragments.

In an embodiment, carrying our any of cancellation and interference reduction to reduce a portion of the receive signal that corresponds to the transmit signal may include generating a copy of the transmit signal, and subtracting the copy of the transmit signal from the receive signal. In an embodiment, carrying out any of cancellation and interference reduction to reduce a portion of the receive signal that corresponds to the transmit signal may include generating a copy of the transmit signal; adjusting the copy of the transmit signal based on a channel response; and subtracting the adjusted copy of the transmit signal from the receive signal. In an embodiment, carrying out any of cancellation and interference reduction to reduce a portion of the receive signal that corresponds to the transmit signal may include generating a copy of the transmit signal; digitally pre-distorting the copy of the transmit signal; adjusting the pre-distorted copy of the transmit signal based on a channel response; and subtracting the pre-distorted and adjusted copy of the transmit signal from the receive signal. In an embodiment, digitally pre-distorting the copy of the transmit signal may include digitally pre-distorting the copy of the transmit signal at one or more frequencies corresponding to the first bandwidth fragment on condition that the transmit signal is transmitted on the pair non-overlapping bandwidth fragments. In an embodiment, digitally pre-distorting the copy of the transmit signal may include digitally pre-distorting the copy of the transmit signal at one or more frequencies corresponding to the first bandwidth fragment on condition that the pair non-overlapping bandwidth fragments on condition that the transmit signal is transmitted on the first bandwidth fragment.

In an embodiment, the signal compensation circuitry may be configured to generate a copy of the transmit signal; adjust the copy of the transmit signal using the channel response, and subtract the adjusted copy of the transmit signal from the receive signal. In an embodiment, signal compensation circuitry may be configured to generate a copy of the transmit signal; digitally pre-distort the copy of the transmit signal; adjust the pre-distorted copy of the transmit signal based on a channel response; and subtract the pre-distorted and adjusted copy of the transmit signal from the receive signal. In an embodiment, the signal compensation circuitry may be configured to digitally pre-distort the copy of the transmit signal by, at least in part, digitally pre-distorting the copy of the transmit at one or more frequencies corresponding to (i) the first bandwidth fragment on condition that the transmit signal is transmitted on the pair non-overlapping bandwidth fragments, or (ii) the pair non-overlapping bandwidth fragments on condition that the transmit signal is transmitted on the first bandwidth fragment. In an embodiment, the signal compensation circuitry include any of an auxiliary transmitter, a radio frequency adder and a digital predistorter.

Figure 2B:
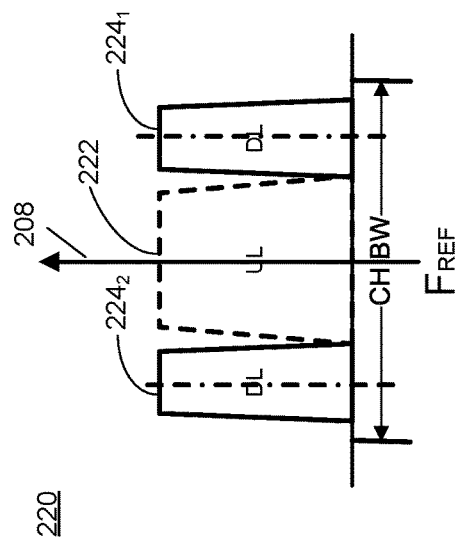
FIGS. 2A-2D illustrate example low duplex spacing (LDS) channel bandwidth allocations.
Figure 2D:
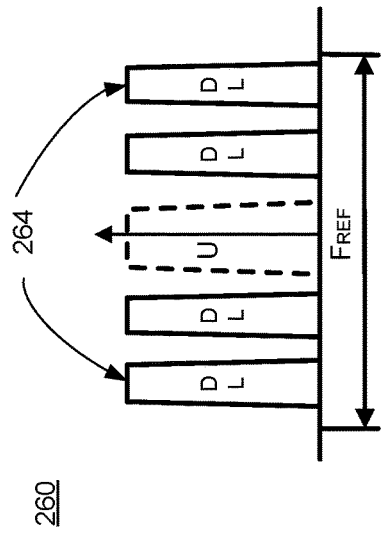
Figure 2A:
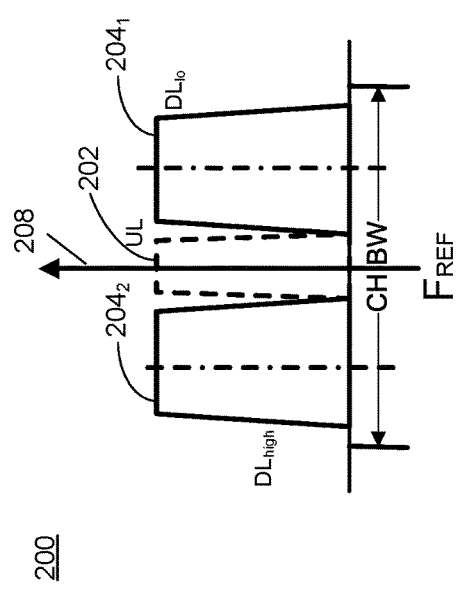

FIG. 2A illustrates an example LDS channel allocation 200. The LDS channel allocations 200 is provided for the purpose of illustration only and is not limiting of the disclosed embodiments. The LDS channel allocation 200 may include an UL portion 202 bounded by a pair of non-overlapping DL portions, namely, $DL_{high}$ portion 204$_1$ and $DL_{low}$ portion 204$_2$ (collectively "$DL_{high}/DL_{low}$ portions 204").

The $DL_{high}/DL_{low}$ portions 204 may be symmetrically offset from a center frequency of the channel or a $F_{LO}$ corresponding to the center frequency (collectively "reference frequency") 208. The $DL_{high}/DL_{low}$ portions 204 may have equal or non-equal bandwidths. The UL portion 202 may be located at the reference frequency 208. The UL portion 202 may partially overlap with $DL_{high}/DL_{low}$ portions 204. If the UL portion 202 does not overlap with the $DL_{high}/DL_{low}$ portions 204, low duplex spacing separates the UL portion 202 from each of the $DL_{high}/DL_{low}$ portions 204. The low duplex spacing may be based on number of carriers. For instance, in a multicarrier system, the duplex spacing can be as small as a sub-channel (a single tone). In a single carrier system, the low duplex spacing may be a small portion of the channel, for example, as small as one percent (1%) of the channel bandwidth. If the UL portion 202 partially overlaps with $DL_{high}/DL_{low}$ portions 204 then DL and UL transmissions do not occur simultaneously on the overlapping portions. In a multicarrier system, there may be at least one subcarrier on which DL and UL transmissions do not occur simultaneously. However, on that subcarrier there could be either a DL transmission or an UL transmission. In a single carrier system, there may be at least some amount of spectrum (for example about 1% of the channel bandwidth) on which DL and UL transmissions do not occur simultaneously.

The LDS channel allocation 200 of FIG. 2 is one example of various LDS channel allocations that may be used during a single or multiple LDS communications. Shown in FIG. 2B is another example LDS channel allocation 220. The LDS channel allocation 220 may include an UL portion 222 bounded by a pair of non-overlapping $DL_{high}/DL_{low}$ portions 224. The LDS channel allocation 220 is similar to the LDS channel allocation 200 except that the UL portion 222 has a larger bandwidth than the UL portion 202 and that the $DL_{high}/DL_{low}$ portions 224 have smaller bandwidths than the $DL_{high}/DL_{low}$ portions 204, respectively.

Figure 2C:
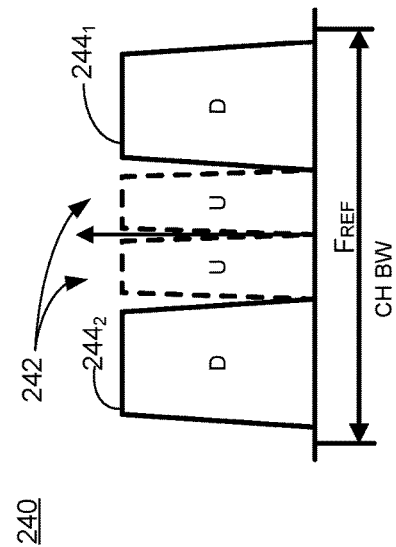

Two other example LDS channel allocations 240 and 260 are shown is FIGS. 2C-2D. The LDS channel allocation 240 is similar to the LDS channel allocation 200 except that the LDS channel allocation 240 may include a pair of UL portions 242 bounded by a pair of non-overlapping $DL_{high}/DL_{low}$ portions 244. The UL portions of the pair 242 may overlap with each other. The LDS channel allocation 260 is similar to the LDS channel allocation 200 except that the LDS channel allocation 260 may include a second pair of non-overlapping $DL_{high}/DL_{low}$ portions 264 having a different offset from the reference frequency 208.

Each of the various LDS channel allocations can be fixed or variable. When variable, any aspect of the LDS channel allocation (e.g., number of total portions, number of DL portions, number of UL portions, locations of the various portions, widths of the various portions, etc.) can be configurable. For example, during an LDS communication, LDS channel allocations may be configured to vary bandwidths of DL portions, UL portions and/or duplex spacing. By way of example, the LDS channel allocations may be varied from LDS channel allocation 200 to LDS channel allocation 220 (or vice versa), thereby changing the bandwidths of the DL portions and the UL portion. Changing LDS channel allocations may be carried out on a semi-static or dynamic basis. For example, the bandwidths of the DL and UL portions may be dynamically configured per packet based on DL/UL traffic requirements.

As would be understood by a person of skill in the art based on the teachings herein, the LDS channel allocations may include more or less than three total portions per channel, more or less than two DL portions per channel, and/or more than one UL portion per channel. For example, the DL and UL portions may be interchanged in the LDS allocations 200 and 220, resulting in a pair of UL portions and one DL portion.

Figure 3:
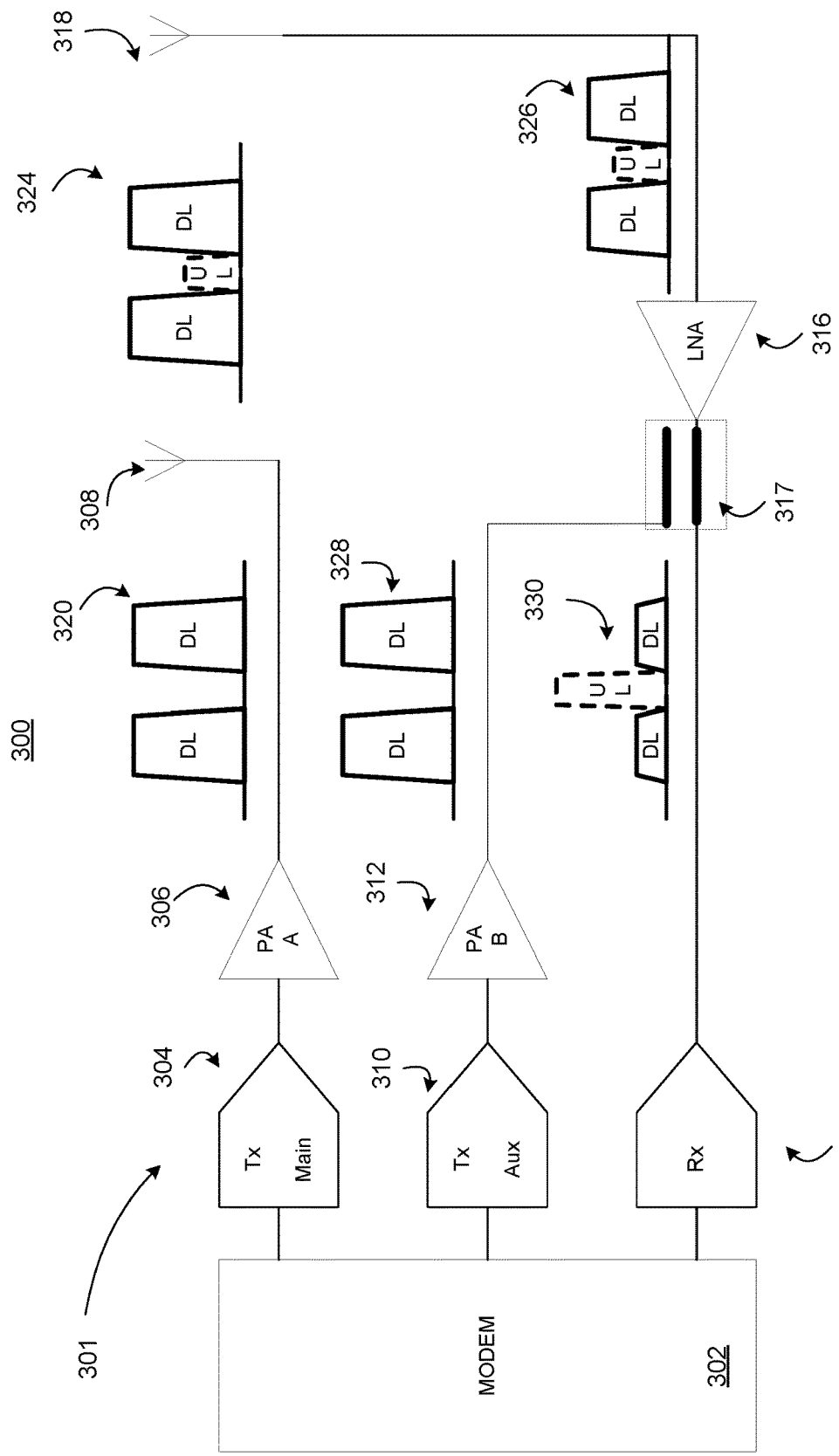
FIG. 3 is a block diagram illustrating an example transceiver.

FIG. 3 is a block diagram illustrating an example transceiver 301 of a wireless communications device 300, such as, for example, a WTRU, base station, etc. The transceiver 301 may be used, as further described below, to realize LDS communications according to an LDS channel allocation (e.g., the LDS channel allocations 200, 220, 240 and 260). The transceiver 301 is provided for the purpose of illustration only and is not limiting of embodiments. Various other transceivers having the same or different architectures may also be used for LDS communications, as well. Such transceivers and/or architectures will become apparent to a person of skill in the art based on the teachings herein.

The transceiver 301 may include a modulator-demodulator (modem) 302, a main transmit (Tx) chain 304, a first power amplifier (PA) 306, an auxiliary Tx chain 310, a second PA 312, a receive (Rx) chain 314, a low-noise amplifier (LNA) 316 and a radio frequency (RF) adder 317. The modem 302 may be communicatively coupled with the main Tx chain 304, the auxiliary Tx chain 310 and Rx chain 314. The main and auxiliary Tx chains 304, 310 may be communicatively coupled with the first and second PAs 306, 312. The first PA may be communicatively coupled with a transmit antenna 308 of the wireless communication device 300. The second PA 312, the Rx chain 314 and the LNA 316 may be communicatively coupled with the RF adder 317. The LNA 316 may be communicatively coupled with a receive antenna 318 of the wireless communication device 300.

The transceiver 301 may be configured to transmit a DL signal and to receive an UL signal according to an LDS channel allocation. For the purpose of illustration only, such LDS channel allocation is assumed to be similar to the LDS channel allocations 200 of FIG. 2A.

The modem 302 may generate and output a digital baseband signal. The main Tx chain 304 may receive the digital baseband signal from the modem 302, and may generate a transmit signal from the digital baseband signal. The main Tx chain 304 may frequency up-convert the transmit signal to a carrier frequency in accordance with the LDS channel allocation, and then send the transmit signal to an input of the PA 306. The PA 306 may receive the transmit signal, and may amplify the transmit signal to generate a DL signal 320 at an output of PA 306. The DL signal 320 may be received by, and transmitted using, the transmit antenna 308. As shown in FIG. 3, the transceiver 301 is configured to transmit the DL signal 320 on DL portions of the LDS channel allocation (e.g., $DL_{high}/DL_{low}$ portions 204).

Simultaneously (or near simultaneously) with the transmission of DL signal 320, an UL signal may be transmitted by another device to the wireless communication device 300. The UL signal may be transmitted in accordance with the LDS allocation such that the UL signal occupies the UL portion of the LDS channel allocation (e.g., UL portion 202). The UL signal may combine with self-interference resulting from DL signal 320 to form an aggregate signal 324. This aggregate signal 324 may occupy the entire channel or at least the UL and DL portions of the LDS channel allocation (e.g., UL portion 202 and $DL_{high}/DL_{low}$ portions 204). The aggregate signal 324 may include a desired UL signal located in the UL portion of the LDS channel allocation and an unwanted self-interference portion located in the DL portions of the LDS channel allocation. The receive antenna 318 may attenuate the aggregate signal 324 to form receive signal 326. In an embodiment, the transmit antenna 308 and the receive antenna 318 may have approximately 30 dB isolation (15 dB isolation when a circulator or a hybrid is used). The LNA 316 may receive the receive signal 326 from the receive antenna 318, and may amplify and send the receive signal 326 to the RF adder 317.

The auxiliary Tx chain 310 along with the second PA 312 and other components (not shown) may form an auxiliary transmitter that may generate and output one or more analog signals for carrying out analog cancellation or reduction of at least some of the unwanted self-interference portion. For example, the auxiliary Tx chain 310 and PA 312 may generate a cancellation signal 328 based on the DL signal 320 (e.g., a copy of the DL signal that is adjusted based on a channel response). The PA 312 may output the cancellation signal 328 to the RF adder 317. At the RF adder 317, the cancellation signal 328 may be combined with (e.g., subtracted from) the receive signal 326 (or the output signal of LNA 316) to reduce the self-interference portion in receive signal 326 and generate and output signal 330. The Rx chain 314 may receive the signal 330, convert it to a digital signal and send the resulting digital signal to the modem 302.

In an embodiment, the cancellation signal 328 may be based the DL signal 320 adjusted for (e.g., an effective, average, etc.) channel response. The cancellation signal 328, for example, may be related to the DL signal 320 by the equation $z[k]=b[k]x[k]$, where $z[k]$ represents cancellation signal 328 on subcarrier k, $x[k]$ represents the DL signal 320 on subcarrier k, and $b[k]$ represents cancellation coefficients for subcarrier k. In an embodiment, the cancellation coefficients $b[k]$ may be selected to increase or maximize self-interference suppression. For example, the cancellation coefficients $b[k]$ may be computed so that the term $h[k]x[k]-g[k]b[k]x[k]$ approaches zero or $b[k]=h[k]/g[k]$, where $h[k]$ may represent the channel on subcarrier k between transmit antenna 308 and receive antenna 318, $h[k]x[k]$ may represent the self-interference at receive antenna 318 due to the DL signal 320, and $g[k]$ may represent the path connecting cancellation signal 328 to RF adder 317 ($g[k]$ may be characterized at design time). In an embodiment, the cancellation coefficients $b[k]$ may be dynamically updated using an adaptive filtering algorithm (e.g., least mean square). In another embodiment, a single tap per tone frequency domain equalizer may be used to generate cancellation signal 328 to reduce complexity.

In an embodiment, to assist the above described cancellation scheme, periodic estimates of the channel $h[k]$ are performed. This can be done using pilot symbols or actual data symbols transmitted in the DL signal 320, for example.

Figure 4A:
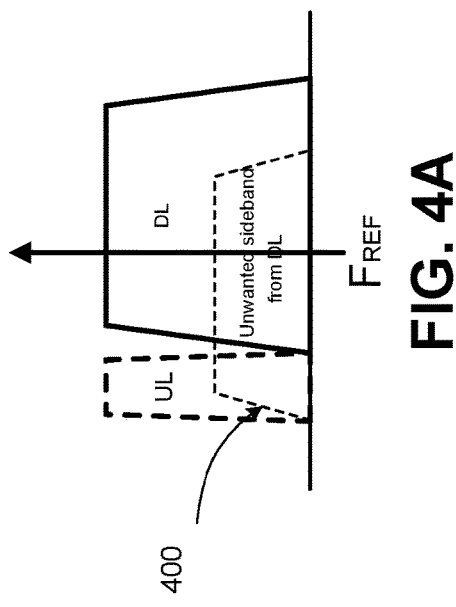
FIG. 4A illustrates linear distortion that results from using non-LDS channel allocations.
Figure 4B:
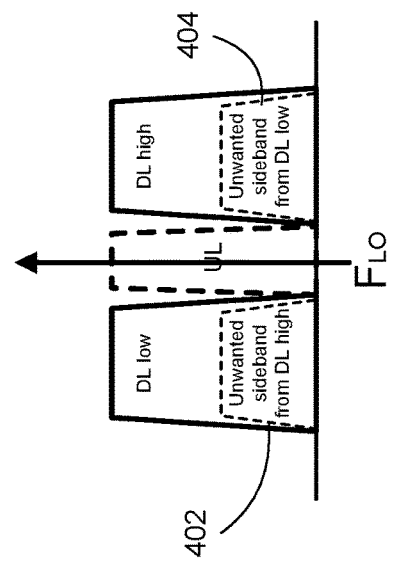
FIG. 4B illustrates resulting linear distortion for example LDS channel allocations.

By using any of the LDS channel allocations 200, 220, 240 and 260 (along with any other like-type LDS channel allocation having symmetric placement of a pair of DL portions around and UL portion (or vice versa)), linear distortions created while transmitting a DL signal do not jam, or at least have a reduced effect on, an UL signal portion of a received signal. Typically, linear distortion (caused by amplitude and/or phase imbalances in the transmit chain) causes unwanted lower and upper sidebands symmetrically located around the center frequency of the DL signal. Asymmetrical placement of the DL and/or UL portions, as illustrated in FIG. 4A, results in an unwanted DL sideband 400 interfering with and/or jamming the UL signal. In contrast, for an LDS allocation having symmetric placement of the DL portions around the UL portion, unwanted sidebands fall outside of the UL portion and may have a reduced or minimal effect on the UL signal. As shown in FIG. 4B, the unwanted sideband 402 due to a $DL_{high}$ portion may fall in a $DL_{low}$ portion, and the unwanted sideband 404 due to the $DL_{low}$ portion may fall in the $DL_{high}$ portion.

Figure 5A:
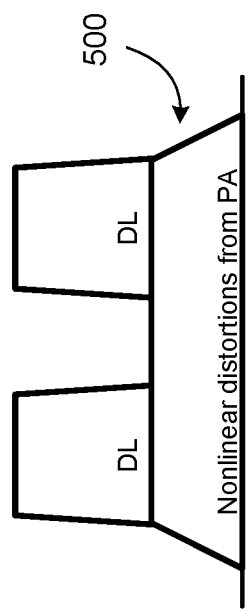
FIG. 5A illustrates an example of nonlinear distortion in a transmit signal.
Figure 5B:
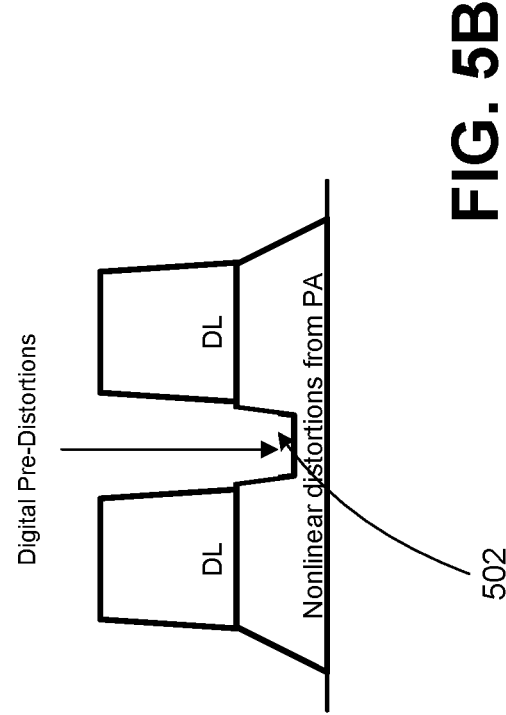
FIG. 5B illustrates an example reduction in nonlinear distortion in a transmit signal resulting from use of digital pre-distortion.

FIG. 5A illustrates example nonlinear distortions 500 created by a radio frequency (RF) transmitter (e.g., a PA). These nonlinear distortions 500 may cause unwanted distortions on the UL signal. In an embodiment, digital pre-distortion may be employed to reduce the effects of the nonlinear distortion on the UL signal. The nonlinear distortion reduced by digital pre-distortion may focused to only part, e.g., the UL portion of the channel, as shown by reference 502 in FIG. 5B. In such embodiment, because the digital pre-distortion might only be applied to a small portion of the channel, additional digital-to-analog converter (DAC) bandwidth may be unnecessary.

With reference to transceiver 300, for example, digital pre-distortion may be applied using the main Tx chain 304 and/or the auxiliary Tx chain 310. In an embodiment, the transceiver 300 may include a digital pre-distorter (not shown). The digital pre-distorter may modify the baseband signal provided to main Tx chain 304 and/or the transmit signal provided to PA 306 to eliminate or reduce nonlinearity introduced by PA 306. The digital pre-distorter may, for example, introduce nonlinearity into the baseband signal and/or the transmit signal. In an embodiment, the nonlinearity introduced by the digital pre-distorter may be equal to or substantially equal to an inverse of the nonlinearity introduced by PA 306. In an embodiment, the digital pre-distorter may transform the baseband signal and/or the transmit signal so that the scaled baseband equivalent of the output of PA 306 is equal to or substantially equal to a desired digital signal $x[k]$.

In another embodiment, The digital pre-distorter may apply digital pre-distortion to signals provided to auxiliary Tx chain 310 and/or PA 312 to distort cancellation signal 328 such that the nonlinear distortion is reduced or eliminated in the UL portion of signal 330.

Pursuant to the new methodologies and/or technologies provided herein, interference suppression up to 115 dB may be achieved. For example, in addition to isolation of approximately 30 dB between the transmit and receive antennas, cancellation of up to 45 dB may be realized at baseband using windowing and other techniques (due to PA distortion, emissions may increase to about −35 dB, but can be reduced to −45 dB using the digital pre-distortion), and 40 dB analog/digital cancellation can be achieved using the auxiliary Tx chain 310. Under this scenario, for a transmit signal of +20 dBm per channel, received self-interference may be approximately −95 dBm (20 dBm-45 dB-30 dB-40 dB), a value that is close to a noise floor of the system. An additional 10 to 15 dB of suppression can be achieved with additional digital cancellation.

The cancellation and/or suppression techniques taught herein may be effective on self-interference and scattering-caused interference. Power levels of reflections due to scattering may be about −50 dB or below. With approximately −75 dB of suppression applied to self-interference (cancellation of up to 45 dB and antenna isolation of 30 dB), antenna cross-talk power level may be 25 dB below that of the reflections. As such, cancellation of the reflections may be carried out to avoid jamming the received signal. In an embodiment, scattering-caused interference may be reduced or eliminated using the same cancellation loop used for reducing/cancelling self-interference (e.g., signal compensation circuitry including the auxiliary Tx chain 310, second PA 312, RF adder 314, LNA 316, etc.). The same cancellation loop may be used because the estimated channel $h[k]$ (where $h[k]$ represents the channel on subcarrier k between transmit antenna 308 and receive antenna 318, for example) may account for both antenna cross-talk and scattering-caused reflections.

One disadvantage of FD communications is receiver complexity. A FD receiver needs a costly high resolution analog-to-digital converter (ADC) to accommodate high input signal levels due to high self-interference. For LDS communications, as discussed above, self-interference may be reduced significantly. As such, a lower resolution ADC may be used in the receiver, reducing cost and complexity. For example, in an embodiment, with a total signal to noise ratio (SNR) for both the desired signal and self-interference at approximately 50 dB (assuming a −65 dBm (+10 dBm-30 dB-45 dB) power level of self-interference at the ADC input, a 15 dB SNR for the desired signal, and a −90 dBm minimum detection power, which results in a 35 dB SNR for the self-interference), a 9-bit ADC may be sufficient. In another embodiment, with added filtering in the received path (low-pass filtering for WTRU), the bit count may be reduced to 8 bits.

LDS systems and communications may offer substantial gains in throughout, energy efficiency, and delay performance over both FD and HD systems. This is in addition to providing lower complexity, lower sensitivity to scattering effects, and the ability to readily configure the DL/UL spectrum allocation (e.g., with changes in the MAC layer, but without higher layer modifications).

Conclusion

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, the term "video" may mean any of a snapshot, single image and/or multiple images displayed over a time basis. As another example, when referred to herein, the terms "user equipment" and its abbreviation "UE" may mean (i) a wireless transmit and/or receive unit (WTRU), such as described supra; (ii) any of a number of embodiments of a WTRU, such as described supra; (iii) a wireless-capable and/or wired-capable (e.g., tetherable) device configured with, inter alia, some or all structures and functionality of a WTRU, such as described supra; (iii) a wireless-capable and/or wired-capable device configured with less than all structures and functionality of a WTRU, such as described supra; or (iv) the like. Details of an example WTRU, which may be representative of any WTRU recited herein, are provided herein with respect to FIGS. 1A-1E.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit (CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM")) or non-volatile (e.g., Read-Only Memory (ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

What is claimed is:

1. A method for communicating over a channel, the method comprising:
   transmitting, via one or more antennas, a transmit signal using a pair of non-overlapping bandwidth fragments of the channel, wherein the pair of non-overlapping fragments are symmetrically offset from a reference frequency associated with the channel;
   receiving, via the one or more antennas, a receive signal from the channel while the transmit signal is being transmitted, wherein the receive signal comprises a desired signal transmitted using a first bandwidth fragment of the channel, wherein the first bandwidth fragment is bounded by, and overlaps or has low duplex spacing with, the pair of non-overlapping bandwidth fragments, wherein the receive signal further comprises (i) a first unwanted sideband resulting from transmission on a first of the pair of non-overlapping bandwidth fragments, and (ii) a second unwanted sideband resulting from transmission on a second of the pair of non-overlapping bandwidth fragments, wherein the first unwanted sideband is coincident with the second non-overlapping bandwidth fragment, and wherein the second unwanted sideband is coincident with the first non-overlapping bandwidth fragment;
   generating a cancellation signal based on the transmit signal and a channel response; and
   using the cancellation signal to reduce one or more portions of the receive signal that correspond to the transmit signal.

2. The method of claim 1, wherein the first bandwidth fragment comprises a pair of bandwidth fragments that are symmetrically offset from the reference frequency.

3. The method of claim 1, wherein the receive signal comprises an uplink signal and the transmit signal is a downlink signal.

4. The method of claim 1, wherein:
   generating the cancellation comprises:
      generating a copy of the transmit signal; and
      adjusting the copy of the transmit signal using the channel response, and
   using the cancellation signal comprises:
      subtracting the adjusted copy of the transmit signal from the receive signal.

5. The method of claim 1, wherein:
   generating the cancellation comprises:
      generating a copy of the transmit signal;
      digitally pre-distorting the copy of the transmit signal; and
      adjusting the pre-distorted copy of the transmit signal based on a channel response; and
   using the cancellation signal comprises:
      subtracting the pre-distorted and adjusted copy of the transmit signal from the receive signal.

6. A method for communicating over a channel, the method comprising:
   transmitting, via one or more transmit antennas, a transmit signal using a first bandwidth fragment of the channel that is bounded by, and overlaps or has low duplex spacing with, a pair of non-overlapping bandwidth fragments of the channel, wherein pair of non-overlapping bandwidth fragments are symmetrically offset from a reference frequency associated with the channel;
   receiving, via one or more receive antennas, a receive signal from the channel while the transmit signal is being transmitted, wherein the receive signal comprises a desired signal transmitted using the pair of non-overlapping bandwidth fragments, wherein the receive signal further comprises (i) a first unwanted sideband resulting from transmission on a first of the pair of non-overlapping bandwidth fragments, and (ii) a second unwanted sideband resulting from transmission on a second of the pair of non-overlapping bandwidth fragments, wherein the first unwanted sideband is coincident with the second non-overlapping bandwidth fragment, and wherein the second unwanted sideband is coincident with the first non-overlapping bandwidth fragment;

generating a cancellation signal based on the transmit signal and a channel response; and using the cancellation signal to reduce one or more portions of the receive signal that correspond to the transmit signal.

7. The method of claim 6, wherein the first bandwidth fragment comprises a pair of bandwidth fragments that are symmetrically offset from the reference frequency.

8. The method of claim 6, wherein the receive signal comprises an uplink signal and the transmit signal is a downlink signal.

9. The method of claim 6, wherein:
generating the cancellation comprises:
generating a copy of the transmit signal; and
adjusting the copy of the transmit signal using the channel response, and
using the cancellation signal comprises:
subtracting the adjusted copy of the transmit signal from the receive signal.

10. The method of claim 6, wherein:
generating the cancellation comprises:
generating a copy of the transmit signal;
digitally pre-distorting the copy of the transmit signal; and
adjusting the pre-distorted copy of the transmit signal based on a channel response; and
using the cancellation signal comprises:
subtracting the pre-distorted and adjusted copy of the transmit signal from the receive signal.

11. A wireless communication device comprising a transmitter, a receiver, one or more receive antennas, one or more transmit antennas and signal compensation circuitry, wherein:
the transmitter is configured to transmit, via one or more antennas, a transmit signal using a pair of non-overlapping bandwidth fragments of the channel, wherein the pair of non-overlapping fragments are symmetrically offset from a reference frequency associated with the channel;
the receiver is configured to receive, via the one or more antennas, a receive signal from the channel while the transmit signal is being transmitted, wherein the receive signal comprises a desired signal transmitted using a first bandwidth fragment of the channel, wherein the first bandwidth fragment is bounded by, and overlaps or has low duplex spacing with, the pair of non-overlapping bandwidth fragments, wherein the receive signal further comprises (i) a first unwanted sideband resulting from transmission on a first of the pair of non-overlapping bandwidth fragments, and (ii) a second unwanted sideband resulting from transmission on a second of the pair of non-overlapping bandwidth fragments, wherein the first unwanted sideband is coincident with the second non-overlapping bandwidth fragment, and wherein the second unwanted sideband is coincident with the first non-overlapping bandwidth fragment;
the signal compensation circuitry is configured to:
generate a cancellation signal based on the transmit signal and a channel response; and
use the cancellation signal to reduce one or more portions of the receive signal that correspond to the transmit signal.

12. The wireless communication device of claim 11, wherein the first bandwidth fragment comprises a pair of bandwidth fragments that are symmetrically offset from the reference frequency.

13. The wireless communication device of claim 11, wherein the pair of non-overlapping bandwidth fragments are allocated for uplink communications and the first bandwidth fragment is allocated for downlink communications.

14. The wireless communication device of claim 11, wherein the signal compensation circuitry is configured to:
generate a copy of the transmit signal;
adjust the copy of the transmit signal using the channel response, and
subtract the adjusted copy of the transmit signal from the receive signal.

15. The wireless communication device of claim 11, wherein the signal compensation circuitry is configured to:
generate a copy of the transmit signal;
digitally pre-distort the copy of the transmit signal;
adjust the pre-distorted copy of the transmit signal based on a channel response; and
subtract the pre-distorted and adjusted copy of the transmit signal from the receive signal.

16. A wireless communication device comprising a transmitter, a receiver, one or more receive antennas, one or more transmit antennas and signal compensation circuitry, wherein:
the transmitter is configured to transmit, via one or more transmit antennas, a transmit signal using a first bandwidth fragment of the channel that is bounded by, and overlaps or has low duplex spacing with, a pair of non-overlapping bandwidth fragments of the channel, wherein pair of non-overlapping bandwidth fragments are symmetrically offset from a reference frequency associated with the channel;
the receiver is configured to receive, via one or more receive antennas, a receive signal from the channel while the transmit signal is being transmitted, wherein the receive signal comprises a desired signal transmitted using the pair of non-overlapping bandwidth fragments, wherein the receive signal further comprises (i) a first unwanted sideband resulting from transmission on a first of the pair of non-overlapping bandwidth fragments, and (ii) a second unwanted sideband resulting from transmission on a second of the pair of non-overlapping bandwidth fragments, wherein the first unwanted sideband is coincident with the second non-overlapping bandwidth fragment, and wherein the second unwanted sideband is coincident with the first non-overlapping bandwidth fragment;
the signal compensation circuitry is configured to:
generate a cancellation signal based on the transmit signal and a channel response; and
use the cancellation signal to reduce one or more portions of the receive signal that correspond to the transmit signal.

17. The wireless communication device of claim 16, wherein the first bandwidth fragment comprises a pair of bandwidth fragments that are symmetrically offset from the reference frequency.

18. The wireless communication device of claim 16, wherein the pair of non-overlapping bandwidth fragments are allocated for uplink communications and the first bandwidth fragment is allocated for downlink communications.

19. The wireless communication device of claim 16, wherein the signal compensation circuitry is configured to:
generate a copy of the transmit signal;
adjust the copy of the transmit signal using the channel response, and
subtract the adjusted copy of the transmit signal from the receive signal.

20. The wireless communication device of claim 16, wherein the signal compensation circuitry is configured to:
   generate a copy of the transmit signal;
   digitally pre-distort the copy of the transmit signal;
   adjust the pre-distorted copy of the transmit signal based on a channel response; and
   subtract the pre-distorted and adjusted copy of the transmit signal from the receive signal.

* * * * *